United States Patent [19]

Miller

[11] Patent Number: 5,009,452
[45] Date of Patent: Apr. 23, 1991

[54] OCCUPANT RESTRAINT SYSTEM

[75] Inventor: Gregory A. Miller, Troy, Mich.

[73] Assignee: General Motors Corporation, Detroit, Mich.

[21] Appl. No.: 511,363

[22] Filed: Apr. 19, 1990

[51] Int. Cl.⁵ .............................................. B60R 21/22
[52] U.S. Cl. .................... 280/730; 280/731; 280/743
[58] Field of Search ............... 280/743, 728, 731, 732, 280/730

[56] References Cited

U.S. PATENT DOCUMENTS

| 3,799,576 | 3/1974 | Fiala | 280/743 |
| 4,902,036 | 2/1990 | Zander et al. | 280/736 |

FOREIGN PATENT DOCUMENTS 2330745  1/1975  Fed. Rep. of Germany ...... 280/743

Primary Examiner—Kenneth R. Rice
Attorney, Agent, or Firm—Herbert Furman

[57] ABSTRACT

An occupant restraint system includes a folded cushion having upper and lower wall portions, fan folded side wall portions and pleat folded end wall portions. A reaction plate fits between the upper wall portion and the immediately adjacent distal folds of the side wall portions. The distal folds are clamped to the reaction plate so that initial deployment of the cushion is laterally of the upper wall portion which remains stationary. As the pressure and volume increase, the distal folds are pulled away from the clamping member and form continuations of the upper wall which deploys toward the occupant.

12 Claims, 2 Drawing Sheets

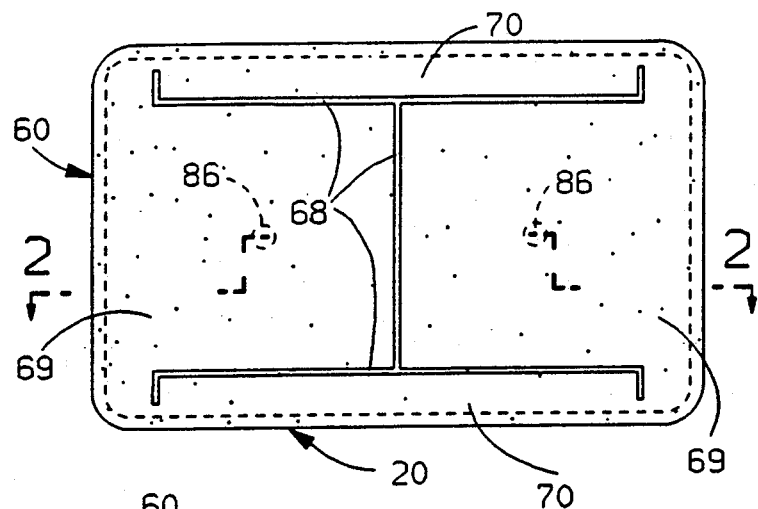
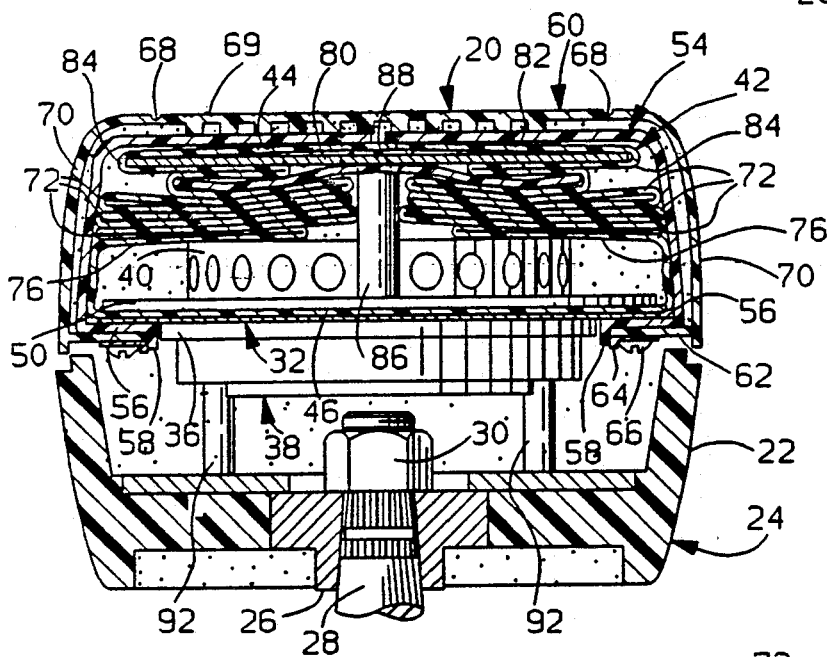
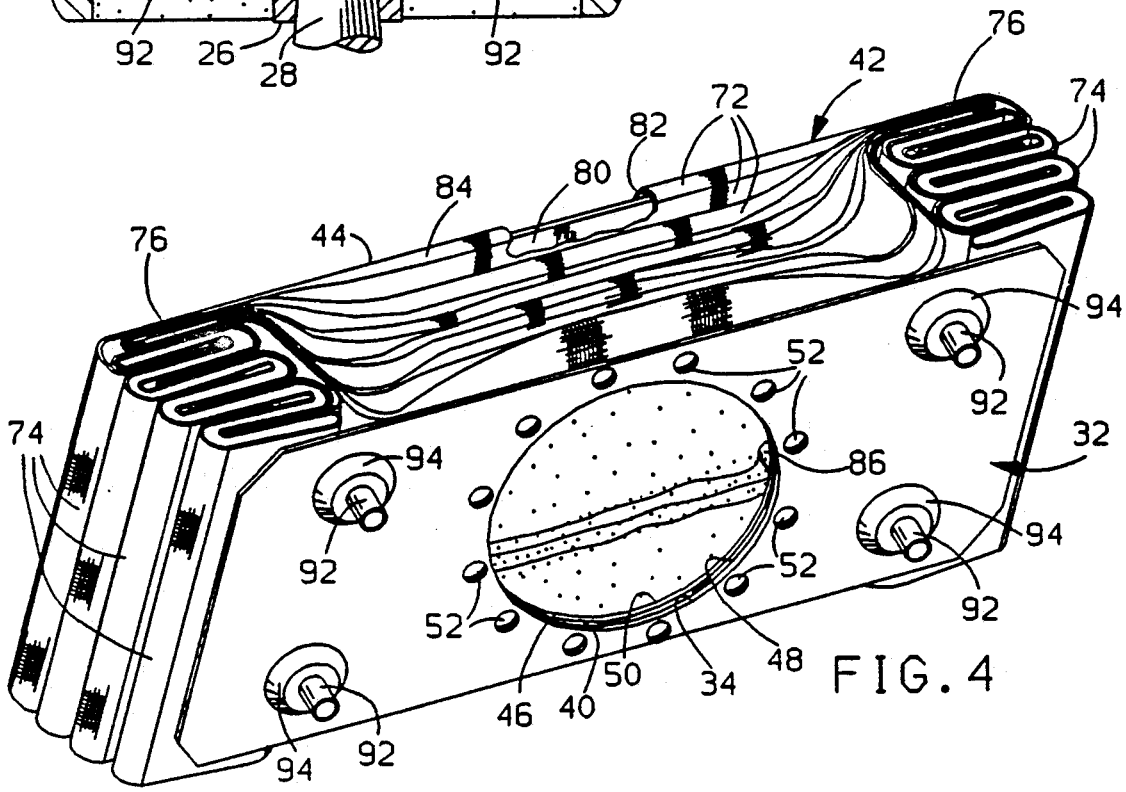

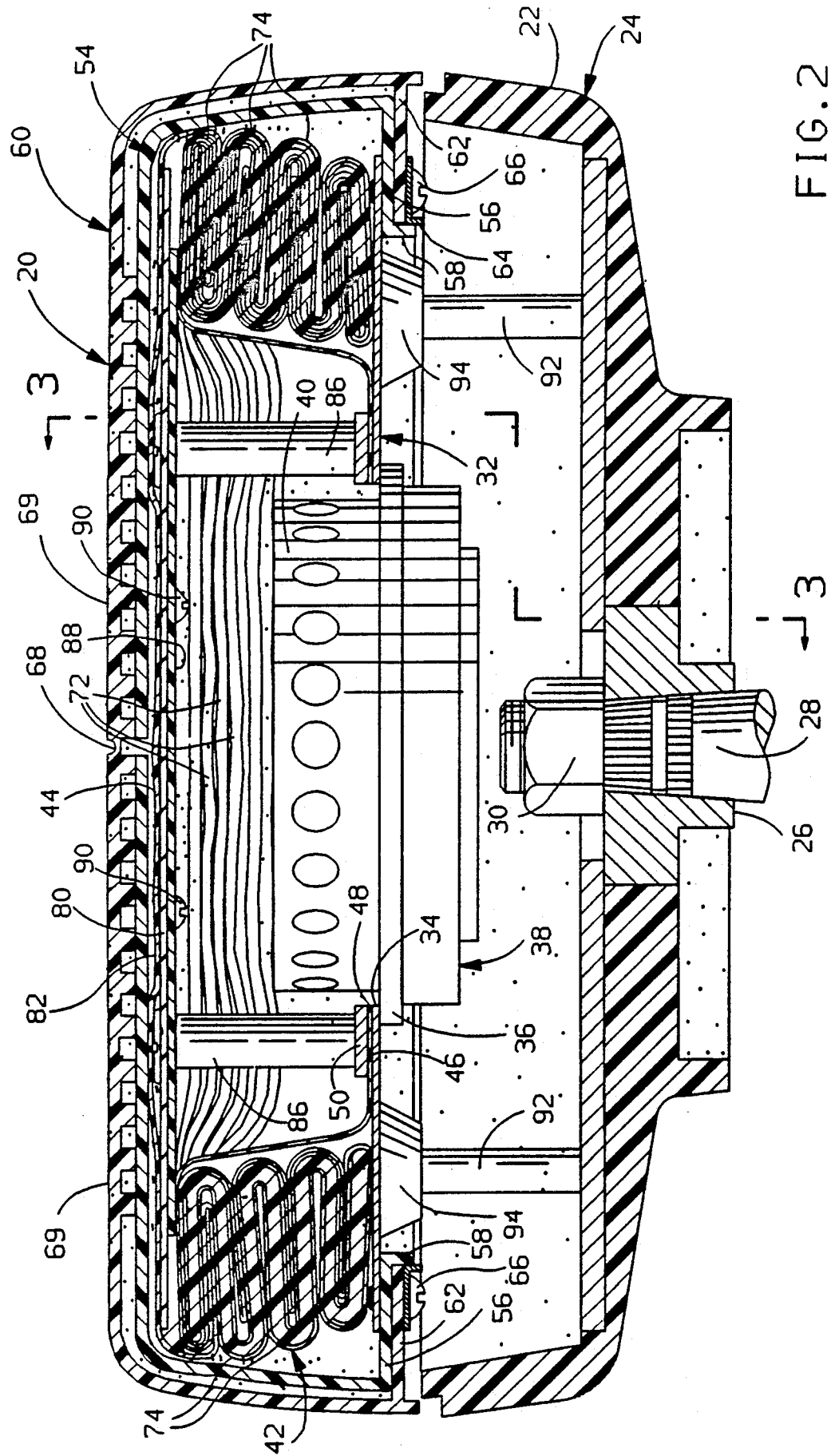

OCCUPANT RESTRAINT SYSTEM

BACKGROUND OF THE INVENTION

This invention relates to inflatable occupant restraint systems and more particularly to an inflatable occupant restraint system which releasably secures the inflatable cushion against initial deployment normal to or toward the occupant and directs such initial deployment laterally of or planar to the occupant.

By directing the initial deployment of an inflatable occupant restraint cushion laterally of or planar to the occupant, there is no engagement of the cushion and the occupant during the initial deployment stage of the cushion and such engagement is delayed to a subsequent stage of deployment.

The restraint system of this invention avoids engagement of the cushion and occupant during the initial deployment stage by releasably securing the cushion against initial deployment normal to or toward the occupant and directing such initial deployment laterally of or planar to the occupant. After initial deployment of the cushion has occurred, the securement is released and the cushion deploys normal to or toward the occupant.

The restraint system includes a known restraint module having a support, an enclosure mounted on the support, a folded occupant restraint cushion mounted on the support and located within the enclosure, and a gas generator or source of pressure fluid mounted on the support within the enclosure and communicating with the interior of the folded cushion. The cushion is folded to provide a generally planar base or upper wall portion of generally rectangular shape, a lower wall portion, fan folded longer side wall portions, and pleat folded end wall portions which are turned under the fan folded side wall portions. The side wall and end wall portions connect the upper and lower wall portions Such a restraint module is shown and described in part in copending application Ser. No. 270,609 Cok et al, Modular Occupant Restraint System, filed Nov. 14, 1988 and assigned to the assignee of this invention. The restraint system of this invention additionally includes a planar reaction member of the general size of the upper wall portion of the cushion and located within the folded cushion between the upper wall portion and the first or distal inwardly directed folds of the fan folded side wall portions. The reaction member is mounted to the support. A clamping member or securement clamps the first or distal folds of the fan folded side wall portions to the lower side of the reaction member.

During initial inflation or deployment of the cushion, the reaction member blocks impingement of the pressure fluid from the gas generator on the upper wall portion of the cushion. The clamping of the first or distal folds of the fan folded side wall portions of the cushion to the lower side of the reaction member blocks the pressure fluid from flowing between such folds and around the sides of the reaction member to the upper side thereof and underneath the upper wall portion of the cushion. The pleat folded end wall portions provide a tortuous path and effectively block the pressure fluid from flowing around the ends of the reaction member to the upper side thereof. Thus, no pressure fluid can impinge on the upper wall portion and the upper wall portion remains stationary during the initial stage of deployment of the cushion. The impingement of the pressure fluid against the fan folded side wall portions of the cushion, other than the first or distal folds, initiates deployment of the cushion laterally of or planar to the occupant through outwardly opening separable flaps in the side walls of the enclosure opposite the side wall portions of the cushion. As the pressure and volume of the pressure fluid build up within the cushion, the fan folded side wall portions continue to unfold. When the volume and pressure of the pressure fluid reach a level sufficient to overcome the clamping force of the clamping member, the first or distal folds of the cushion are pulled outwardly and away from the lower side of the reaction member to permit the pressure fluid to impinge on the upper wall portion of the cushion around the reaction member as the distal folds unfold relative to the side and upper wall portions. The impingement of the pressure fluid on the upper wall portion initiates deployment of the cushion through outwardly opening separable flaps in the upper wall of the enclosure as the pleat folded end wall portions unfold, to provide the upper or outer wall of the cushion which moves normal to or toward the occupant. The subsequent engagement of the occupant and such upper or outer wall during such movement provides the occupant restraint.

The primary feature of this invention is that it provides an occupant restraint system which releasably secures an inflatable occupant restraint cushion against movement normal to or toward an occupant during the initial stage of deployment of the cushion. Another feature is that the cushion is deployed in directions laterally of or planar to the occupant during the initial deployment stage. A further feature is that the wall of the cushion engageable by the occupant is releasably secured against movement normal to or toward the occupant during the initial deployment stage. Yet another feature is that such wall of the cushion is released when the volume and pressure of the inflating pressure fluid build up to a predetermined level. Yet a further feature is that the cushion is folded to provide a base or upper wall portion, fan folded side wall portions and pleat folded end wall portions, with the distal folds of the fan folded side wall portions being releasably clamped to a reaction member. Still another feature is that the reaction member is planar, of the general size of the upper wall portion of the folded cushion, and has its upper side engaging such upper wall portion and its lower side clamped to the distal folds of the fan folded side wall portions. Still a further feature is that the reaction member is mounted to the support for the cushion. Yet another feature is that the clamping force is provided by a clamping member mounted to the lower side of the reaction member.

These and other features of the invention will be readily apparent from the following specification and drawings wherein:

FIG. 1 is a top plan view of an occupant restraint system according to this invention.

FIG. 2 is an enlarged sectional view taken along line 2—2 of FIG. 1.

FIG. 3 is a sectional view taken along line 3—3 of FIG. 2, and

FIG. 4 is a partially broken away perspective view of a portion of FIG. 2.

Referring now to FIGS. 1 through 3 of the drawings, an occupant restraint system 20 is shown mounted in a conventional manner to the hub portion 22 of a vehicle steering wheel 24. The hub portion includes a splined bushing 26 which receives the upper splined end of the vehicle steering shaft 28 and is bolted thereto at 30 to secure the steering wheel to the vehicle steering system.

A generally rectangularly shaped support or plate 32, FIG. 4, has a central circular opening 34. The flange 36 of a conventional inflator 38 seats against the lower side of the plate 32 and is secured thereto in a conventional manner. The upper outlet portion 40 of the inflator projects through the plate 32 and into the interior of a folded inflatable driver restraint cushion 42. The cushion 42 includes upper and lower or forward and rearward circular members 44 and 46 which are secured together at their circular edge portions. The upper or forward cushion member 44 provides the impact surface of the cushion for the driver when the cushion is inflated, and the lower or rearward cushion member 46 has a central opening 48 which receives the upper outlet portion 40 of the gas generator therethrough. A ring 50 is fastened at 52 to the plate 32 around the opening 34 therein to clamp the cushion member 46 to the plate 32 around the opening 48 therethrough.

The inflator 38 is a gas generator which is electrically actuated from a conventional electrical power source when acceleration or velocity or other type sensors sense the impact of the vehicle with an obstacle or the possibility or probability of such an impact. Such sensors and the circuits connecting the sensors to a power source are well known in the art. Likewise, inflators of the gas generating type are also well known in the art.

A container 54 for the cushion 42 is formed of plastic material and has a generally box-like rectangular shape. The container 54 houses the folded cushion 42 and has a flange 56 which underlies the plate 32 and has lateral flange segments 58 therealong. An outer decorative cover 60 of plastic material is of the same general shape as the container 54. The cover 60 has a flange 62 which overlies the flange 56 of the container. A retainer 64 overlies the flanges 62 and is fastened at 66 to the support plate 32 to secure the container and cover to the support plate.

The cover 60 is provided with a molded in line 68 in its forward or upper wall and longer or 6 and 12 o'clock side walls to provide the upper wall with oppositely opening separable flaps 69 and provide the longer side walls with oppositely opening separable flaps 70. The container 54 is provided with lines of perforations which provide like flaps in the upper and longer side walls thereof. The details of the container 54 and the cover 60, and the manner in which each separates into flaps during deployment of the cushion 42 are disclosed in the aforenoted Cok et al application. Such disclosure is incorporated herein by reference.

The plate 32 thus mounts the inflator 38, the cushion 42, the container 54, and the cover 60 to provide the modular restraint system 20.

The manner in which the cushion 42 is folded is disclosed in the aforenoted Cok et al application. Generally, the upper and lower circular cushion members 44 and 46 of the cushion are laid flat with respect to each other, then diametrically opposite chordal portions of the cushion members are fan folded with respect to each other to provide a series of fan folds 72, FIGS. 3 and 4. Then, each end of the chordal portions and fan folds is pleat folded to provide a series of folds 74, FIGS. 2 and 4. The folds 74 as a unit are then tucked under or folded under respective ends of the last or proximal fold 76 of folds 72 rather than extending from the folds 72 as shown in the aforenoted Cok et al application. The folded cushion thus has fan folded side wall portions and pleat folded end wall portions.

A reaction plate or member 80 of the general size of the base or upper wall portion 82 of the folded cushion is located between such wall portion and the first or distal folds 84 of the folds 72 of the fan folded side wall portions. The reaction member is generally planar and formed of metal or other material which will withstand the temperature and pressure of the gases generated by the inflator 38. The reaction member 80 is located within the folded cushion by a pair of pins or struts 86 which have their lower ends secured to the ring 50 and their upper ends secured to the reaction member 80. A clamping member 88 of plastic material is fastened at 90 to the underside of the reaction member 80 along the longitudinal center line of both members. The clamping member is of a smaller size than the reaction member and has its unsecured longitudinal portions underlying and clamping the first or distal folds 84 to the underside of the reaction member 80 with a predetermined force. The reaction member 80, the clamping member 88, the struts 86 and the ring 50 are assembled as a unit and then inserted into the interior of the folded cushion through the opening 48 in the lower cushion member 46. The ring 50 is then assembled to the plate 32 and to the inflator 38 to provide the assembly shown in FIG. 4. This assembly is then assembled with the container 54 and the cover 60 with the fan folded side wall portions opposite the longer or 6 and 12 o'clock side walls and the pleat folded end portions opposite the shorter or 3 and 9 o'clock side walls. The completed occupant restraint system is assembled in overlying relationship to the hub portion 22 by fasteners, not shown, which extend upwardly through openings in the hub portion and into tapped struts 92 which are secured to embossments 94 of the plate 32.

When the inflator receives an appropriate signal, the inflator generates gas or pressure fluid which exits into the interior of the folded cushion 42 through the upper outlet portion 40 of the inflator. The pressure fluid initiates unfolding of the folds 72 of the fan folded side wall portions of the cushion 42 to initiate deployment of the cushion through the separable flaps 70 in the longer or 6 and 12 o'clock side walls of the container 54 and cover 60. The base or upper wall portion 82 of the cushion 42 remains stationary since the clamping of the first or distal folds 84 to the reaction member 80 by the clamping member 88 prevents the pressure fluid from flowing around the sides of the reaction member and impinging on such upper wall portion 82. The tortuous paths provided by the folds 74 of the pleat folded end wall portions prevent the pressure fluid from flowing around the ends of the reaction member and impinging on the upper wall portion 82 of the cushion Thus, the upper wall portion 82 of the cushion remains stationary and the cushion is initially deployed laterally of the occupant through the longer or 6 and 12 o'clock side walls of the container and cover through the separable flaps 70.

As the volume and pressure of the pressure fluid rise within the initially deploying cushion 42, the first or distal folds 84 are pulled outwardly from between the clamping member 88 and the reaction member 80 and begin to unfold into continuations of the other folds 72 and the upper wall portion 82 of the cushion as the pressure fluid impinges on the folds 84 and the upper wall portion 82. The unfolding of the folds 84 and the impingement of the pressure fluid on the upper wall portion 82 initiate deployment of the cushion normal to the occupant through the upper walls of the container and cover as the separable flaps 69 separate and open outwardly and oppositely of each other. The deployment of the cushion normal to or toward the occupant is delayed or occurs subsequent to the deployment of the cushion laterally of or planar to the occupant. The engagement of the cushion and occupant as the cushion deploys normal to or toward the occupant provides the occupant restraint.

The securing force of the clamping member 88 can be varied as desired in order to predetermine the delay in deployment of the cushion normal to or toward the occupant. The aforenoted Cok et al application shows various arrangements or embodiments of separable flaps in the upper and longer side walls of the container and cover. The restraint system of this invention can be used with each of these embodiments.

Thus, this invention provides an inflatable occupant restraint system which releasably secures an inflatable occupant restraint cushion against deployment normal to or toward the occupant and directs such initial deployment laterally of or planar to the occupant. The securement of the cushion is released at a predetermined time to permit deployment of the cushion normal to or toward the occupant to delay the engagement of the occupant and cushion until after initial deployment of the cushion.

The embodiments of the invention in which an exclusive property or privilege is claimed are defined as follows:

1. An occupant restraint system comprising, support means, an occupant restraint cushion mounted to the support means and including an upper wall portion, a lower wall portion, and spaced side wall portions intermediate the upper and lower wall portions, each side wall portion having a number of folds, planar reaction means mounted on the support means and located between the upper wall portion and the folds of the side wall portions immediately adjacent thereto, and means releasably securing such immediately adjacent folds to the reaction means during initial inflation of the cushion from a source of pressure fluid to restrict such initial deployment laterally of the occupant by unfolding of the folds of the side wall portions, other than the secured folds, while maintaining the upper wall portion generally stationary.

2. An occupant restraint system comprising, a source of pressure fluid, support means, an occupant restraint cushion mounted to the support means and including an upper wall portion and spaced side wall portions, each side wall portion having a number of folds, reaction means mounted on the support means and located between the source of pressure fluid and the upper wall portion and within at least one fold of each of the side wall portions, and means releasably securing the one fold of each side wall portion to the reaction means during initial inflation of the cushion from the source of pressure fluid to prevent the pressure fluid from impinging on the upper wall portion and thereby maintaining the upper wall portion generally stationary, the pressure fluid impinging on the unsecured folds of the side wall portions to initiate deployment of the cushion laterally of the occupant by unfolding such unsecured folds.

3. An occupant restraint system comprising, a source of pressure fluid, an occupant restraint cushion mounted to the support means and including an upper wall portion and spaced side wall portions, each side wall portion having a number of folds, reaction means mounted on the support means and located between the source of pressure fluid and the upper wall portion, and means releasably securing at least one fold of each of the side wall portions to the reaction means during initial inflation of the cushion from the source of pressure fluid to prevent the pressure fluid from flowing around the reaction means and impinging on the upper wall portion of the cushion, the pressure fluid impinging on the unsecured folds of the side wall portions to unfold such folds and initiate deployment of the cushion laterally of the occupant while maintaining such upper wall portion generally stationary.

4. An occupant restraint system comprising, a source of pressure fluid, support means, an occupant restraint cushion mounted to the support means and including an upper wall portion, a lower wall portion, fan folded side wall portions, and pleat folded end wall portions, each side wall portion having a number of folds, reaction means mounted on the support means and located between the upper wall portion and the distal folds of each of the side wall portions immediately adjacent thereto, means releasably securing such distal folds to the reaction means for a predetermined time during initial deployment of the cushion, the securement of the distal folds to the reaction means and the tortuous path provided by the pleat folded end wall portions restricting impingement of the pressure fluid on the upper wall portion during initial deployment of the cushion to maintain such upper wall portion stationary until passage of the predetermined time and release of the distal folds, the impingement of the pressure fluid on the unsecured folds during the predetermined time directing initial deployment of the cushion laterally of the upper wall portion, secured distal folds.

5. An occupant restraint system comprising, a support having an opening, a source of pressure fluid through the support opening, an occupant restraint cushion including a lower wall portion mounted to the support adjacent the opening therein, an upper wall portion spaced from the lower wall portion, fan folded side wall portions connecting the upper and lower wall portions each including a number of fan folds, and pleat folded end wall portions folded under the upper wall portion as a unit, a reaction plate of the general size of the upper wall portion located between the upper wall portion, the pleat folded end wall portions, and the distal folds of the side wall portions, means extending between the plate and the support mounting the plate in overlying relationship to the support opening and to the pressure fluid source, and a clamping member mounted to the plate and clamping the distal folds of the side wall portions to the plate to provide a seal blocking the flow of pressure around the sides of the reaction plate to the upper wall portion of the cushion the pleat folded end wall portions providing tortuous paths blocking the blow of pressure fluid around the ends of the reaction plate whereby the upper wall portion remains stationary, the impingement of the pressure fluid on the unclamped folds unfolding such folds to initiate deployment of the side wall portions of the cushion laterally of the upper wall portion while the upper wall portion remains stationary.

6. An occupant restraint system for a vehicle occupant comprising, a source of pressure fluid, support means, an occupant restraint cushion mounted to the support means and including an upper wall portion facing the occupant and spaced side wall portions, each side wall portion having a number of folds, and means mounted on the support means and releasably securing the upper wall portion and at least one fold of each of the side wall portions against movement in a direction toward the occupant during initial inflation of the cushion from the source of pressure fluid, the pressure fluid impinging on the unsecured folds of the side wall portions during such initial deployment of the cushion to unfold such unsecured folds and deploy the cushion laterally of the occupant 7. An occupant restraint system comprising, a support having an opening, a source of pressure fluid through the support opening, an occupant restraint cushion including a lower wall portion mounted to the support adjacent the opening therein, an upper wall portion spaced from the lower wall portion, and fan folded side wall portions connecting the upper and lower wall portions and including a number of fan folds, a reaction plate located between the upper wall portion and the distal folds of the side wall portions, means extending between the plate and the support mounting the plate in overlying relationship to the support opening and to the pressure fluid source, and clamping means mounted to the plate and clamping the distal folds of the side wall portions to the plate to block the blow of pressure fluid around the reaction plate to the upper wall portion of the cushion and maintain such upper wall portion stationary, the impingement of the pressure fluid on the unclamped folds unfolding such folds to initiate deployment of the side wall portions of the cushion laterally of the upper wall portion while the upper wall portion remains stationary.

8. An occupant restraint system comprising, support means, an occupant restraint cushion including a lower wall portion mounted to the support means, an upper wall portion spaced from the support means, folded side wall portions interconnecting the upper and lower wall portions, and folded end wall portions interconnecting the upper and lower wall portions, a source of pressure fluid mounted to the support means and opening to the interior of the cushion through the lower wall portion to deploy the cushion, pressure fluid reaction means covering the upper wall portion to prevent impingement of the pressure fluid thereagainst, means mounting the reaction means on the support means in overlying spaced relationship to the source of pressure fluid, and means releasably sealing the space between the reaction means and the upper wall of the cushion against entry of the pressure fluid during the initial deployment of the cushion to restrict such initial deployment laterally of the occupant by unfolding of the folded side wall portion and end wall portion thereof while maintaining such upper wall portion generally stationary.

9. The combination recited in claim 8 wherein the reaction means includes a planar member having the edge portions thereof sealed to the upper wall portion by the releasable sealing means.

10. The combination recited in claim 8 wherein the reaction means is a generally planar member of the general size of the upper wall portion of the cushion.

11. The combination recited in claim 8 wherein the source of pressure fluid is an inflator mounted to the support means, and the mounting means extends between the reaction means and the support means adjacent the inflator.

12. The combination recited in claim 8 wherein the reaction means includes a planar member of the general size of the upper wall portion of the cushion and located between such upper wall portion and the distal portions of the folded side wall portion and end wall portion of the cushion.

* * * * *